(12) United States Patent
Tsuchiya et al.

(10) Patent No.: US 9,407,800 B2
(45) Date of Patent: Aug. 2, 2016

(54) LENS UNIT AND IMAGE PICKUP DEVICE INCLUDING SAME

(71) Applicant: XACTI CORPORATION, Daito-shi, Osaka (JP)

(72) Inventors: Kaoru Tsuchiya, Daito (JP); Yuki Tanohata, Nishinomiya (JP)

(73) Assignee: XACTI CORPORATION, Daito-shi, Osaka (JP)

( * ) Notice: Subject to any disclaimer, the term of this patent is extended or adjusted under 35 U.S.C. 154(b) by 0 days.

(21) Appl. No.: 14/417,001

(22) PCT Filed: Jul. 22, 2013

(86) PCT No.: PCT/JP2013/069796
§ 371 (c)(1),
(2) Date: Jan. 23, 2015

(87) PCT Pub. No.: WO2014/017437
PCT Pub. Date: Jan. 30, 2014

(65) Prior Publication Data
US 2015/0207969 A1    Jul. 23, 2015

(30) Foreign Application Priority Data

Jul. 26, 2012 (JP) ................................. 2012-165849

(51) Int. Cl.
*H04N 5/225* (2006.01)
*G02B 7/02* (2006.01)
(Continued)

(52) U.S. Cl.
CPC .............. *H04N 5/2254* (2013.01); *G02B 7/023* (2013.01); *G02B 13/16* (2013.01); *G03B 17/02* (2013.01); *H04N 5/2253* (2013.01); *G02B 7/02* (2013.01); *G03B 43/00* (2013.01); *H04N 5/225* (2013.01)

(58) Field of Classification Search
CPC ... H04N 5/225; H04N 5/2253; H04N 5/2254; G02B 7/023
See application file for complete search history.

(56) References Cited

U.S. PATENT DOCUMENTS 5,731,834 A * 3/1998 Huot .................... H04N 5/2253
348/340
2006/0222300 A1* 10/2006 Frenzel .................. G02B 7/021
385/88

(Continued)

FOREIGN PATENT DOCUMENTS

JP    2010-11040 A    1/2010
JP    2011-154105 A   7/2010

(Continued)

OTHER PUBLICATIONS

International Search Report dated Oct. 15, 2013 issued in corresponding application No. PCT/JP2013/069796.

(Continued)

*Primary Examiner* — Roberto Velez
*Assistant Examiner* — Abdelaaziz Tissire
(74) *Attorney, Agent, or Firm* — Westerman, Hattori, Daniels & Adrian, LLP (57) ABSTRACT

A lens unit including a lens barrel that contains a lens inside and has a rectangular image pickup window through which an optical axis passes, and an image pickup element unit including an image pickup element and an element attachment plate having the image pickup element mounted on one surface. The image pickup element unit is attached to the lens barrel by a plurality of screws such that the image pickup window and the image pickup element are opposite to each other. A shim unit is disposed between the lens barrel and the element attachment plate. The shim unit is made of a shim base attached to a circumferential edge of the image pickup window and having a shape along at least two sides of the image pickup window, and one or a plurality of shims mounted at one or a plurality of portions of the shim base, respectively.

7 Claims, 8 Drawing Sheets

(51) Int. Cl.
*G03B 17/02* (2006.01)
*G02B 13/16* (2006.01)
*G03B 43/00* (2006.01)

(56) References Cited

U.S. PATENT DOCUMENTS

2011/0273788 A1 11/2011 Koyama
2015/0070557 A1* 3/2015 Petty .................... H04N 5/2251
                                                            348/333.01

FOREIGN PATENT DOCUMENTS

JP  2011-188254 A  9/2011
JP  2011-237594 A  11/2011

OTHER PUBLICATIONS

Office Action for the corresponding Japanese Application No. 2012-165849 issued on Apr. 19, 2016. (6 pages).

* cited by examiner

LENS UNIT AND IMAGE PICKUP DEVICE INCLUDING SAME

TECHNICAL FIELD

The present invention relates to a lens unit capable of easily performing tilt adjustment between an image pickup element and a lens barrel, and an image pickup device including the same.

BACKGROUND ART

There has been known an image pickup device such as a digital camera that converts image pickup signals of an image and a moving picture obtained by an image pickup element such as a CCD or a CMOS to digital image data, stores the same in a memory or the like, and displays the same on a liquid crystal display unit.

In this type of image pickup device, the image pickup element needs to be attached to a lens barrel such that a center of an image pickup surface of the image pickup element coincides with an optical axis of lenses disposed in a lens barrel, and the image pickup surface and the lens optical axis are perpendicular to each other.

The attachment of the image pickup element to the lens barrel is performed by attaching, to the lens barrel, an element attachment plate with the image pickup element attached thereto. However, since respective parts such as the image pickup element, the element attachment plate, the lenses, and the lens barrel vary among individuals on manufacturing, simply assembly of these parts may cause the image pickup surface of the image pickup element to tilt against the lens optical axis. Thus, so-called tilting adjustment of adjusting an attachment angle of the image pickup element to the lens barrel needs to be performed.

Moreover, together with the tilting adjustment, so-called flange back adjustment of adjusting a distance between the image pickup element and the lens barrel needs to be performed.

In connection with this, Patent Document 1 discloses a configuration in which a plurality of springs are fitted between the element attachment plate and the lens barrel, and the image pickup element is attached to the lens barrel by a plurality of screws. Herein, the tilting adjustment and the flange back adjustment (hereinafter, these are collectively referred to as "tilt adjustment") are performed by adjusting a tightening amount of each of the screws with reference to an output image, using measurement equipment.

PRIOR ART DOCUMENT

Patent Document

Patent Document 1: Japanese Patent Laid-open Publication No. 2011-188254

SUMMARY OF THE INVENTION

Problems to be Solved by the Invention

However, the image pickup element and the like are very small parts, and in order to perform this tilt adjustment, work for mounting the plurality of minute springs is very difficult. Moreover, since the minute springs vary in spring strength, the variation may make the tilt adjustment difficult.

Moreover, since the tilt adjustment is performed with reference to the output image, adjustment work takes a very long time.

Consequently, there has also been proposed a technique of superimposing and disposing a plurality of shims in place of the springs to perform the tilt adjustment.

However, since the shims are also thin, minute parts, work for placing the individual shims in the lens barrel is very difficult, and if the shim drops into the lens barrel during attaching the shims in the assembly or during detaching the image pickup element from the lens barrel for maintenance, takeout is almost impossible.

An object of the present invention is to provide a lens unit capable of easily performing tilt adjustment between an image pickup element and a lens barrel, and an image pickup device including the same.

Means for Solving the Problems

A lens unit according to the present invention is a lens unit including:

a lens barrel that contains a lens inside and has a rectangular image pickup window through which an optical axis passes; and an image pickup element unit including an image pickup element and an element attachment plate having the image pickup element mounted on one surface, the lens unit having the image pickup element unit attached to the lens barrel by a plurality of screws such that the image pickup window and the image pickup element are opposite to each other, wherein a shim unit is disposed between the lens barrel and the element attachment plate, and the shim unit is made of a shim base attached to a circumferential edge of the image pickup window and having a shape along at least two sides of the image pickup window, and one or a plurality of shims mounted at one or a plurality of portions of the shim base, respectively.

Effects of the Invention

A lens unit according to the present invention can easily perform tilt adjustment by a shim unit in which one or a plurality of shims are placed on a shim base.

Since the shim(s) can be beforehand placed on the shim base, the shims) need not be individually disposed in a lens barrel. Accordingly, in assembly and maintenance of the lens unit, the shim can be prevented from dropping into the lens barrel, and so on.

DETAILED DESCRIPTION OF EMBODIMENTS

The present invention relates to a lens unit 20 capable of easily performing tilt adjustment, and an image pickup device 10 including the same, wherein a correction amount for the tilt adjustment is beforehand calculated, and based on the calculated correction amount, a thickness of a shim unit 40 used for the tilt adjustment is beforehand adjusted, and then, a lens unit 20 is assembled.

Figure 1:
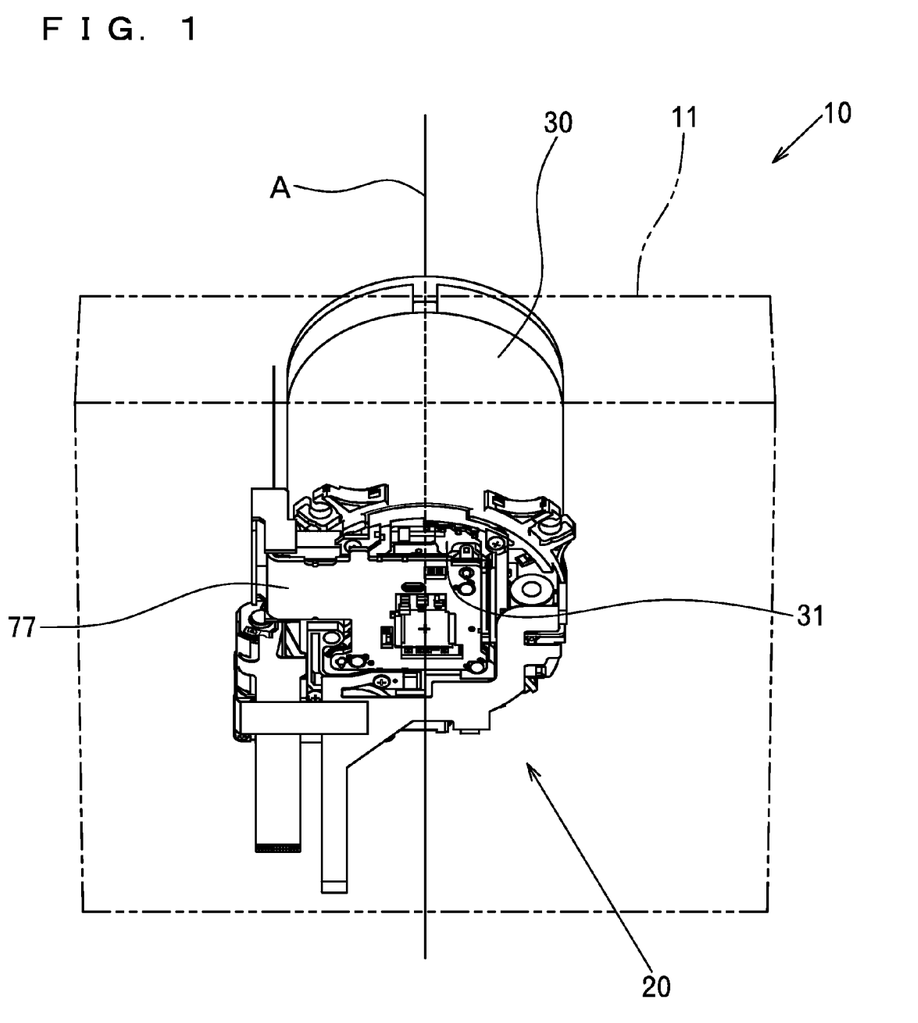
FIG. 1 is a perspective view when a digital camera including a lens unit according to one embodiment of the present invention is viewed from the diagonal rear.

As one embodiment of the present invention, the lens unit 20 is attached to a front surface side of a casing 11, as shown in FIG. 1 to configure the image pickup device 10 that picks up an image and a moving picture, such as a digital camera.

Figure 2:
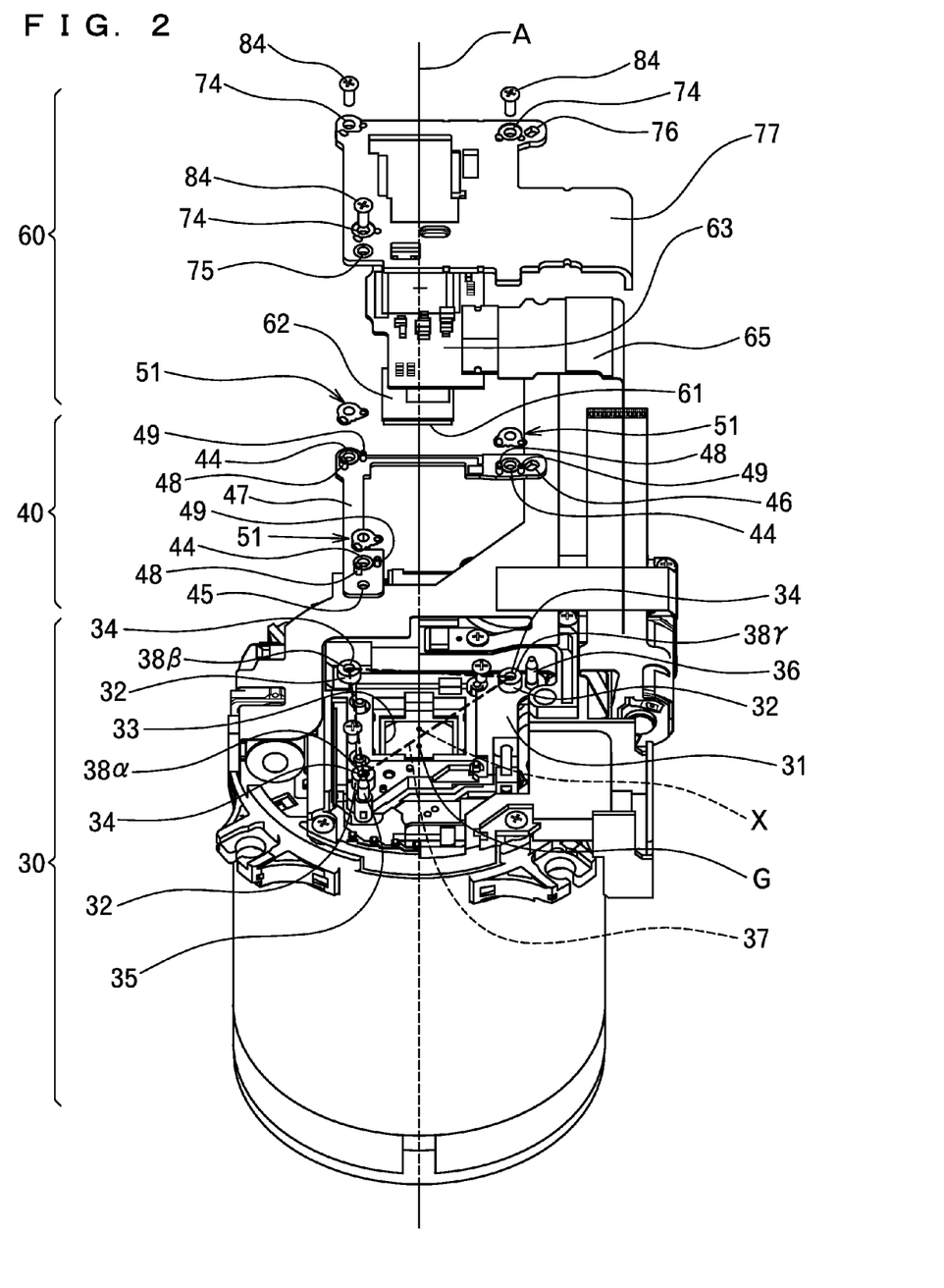
FIG. 2 is an exploded perspective view of the lens unit according to one embodiment of the present invention.

FIG. 2 is an exploded perspective view of the lens unit 20. The lens unit 20 includes the shim unit 40 that performs the tilt adjustment between a cylindrical lens barrel 30 that contains one or a plurality of image pickup lenses inside, and an image pickup element unit 60 configured by attaching an image pickup element 62 having an image pickup surface 61 to an element attachment plate 77.

As shown in FIG. 2, in the lens barrel 30, a rectangular image pickup window 33 that guides light passing through the image pickup lenses) to the image pickup element 62 is provided on a base end side, and a circumferential edge of the image pickup window 33 is a unit attachment surface 31 to which the shim unit 40 and the image pickup element unit 60 are attached.

As one embodiment of the unit attachment surface 31, as shown in FIG. 2, bosses 32 having screw holes 34 to fasten the tilt adjustment unit 40 and the image pickup element unit 60 together with the screw are projected in the vicinity of three vertexes among vertexes of the rectangular image pickup window 33. More specifically, these bosses 32 are disposed on a circle having a center at a center of gravity G of the rectangular image pickup window 33.

Tips of these bosses 32 may be employed as a datum level 37 of the tilt adjustment. In this datum level 37, three positions corresponding to the bosses 32, 32, 32 are shim mounting positions 38α, 38β, 38γ where shims 51 described later are placed and positioned. An intersection point with a perpendicular drawn to the datum level 37 from the center of gravity G is referred to as a design center X of the lens barrel 30.

In the unit attachment surface 31, guides 35, 36 to position the tilt adjustment unit 40 and the image pickup element unit 60 are projected so as to cross the rectangular image pickup window 33 substantially diagonally.

As shown in FIG. 2, the shim unit 40 includes a shim base 47 having a shape along at least two sides of the rectangular image pickup window 33 and the one or the plurality of shims 51 (thickness adjustment members) placed on the shim base 47.

In an illustrated example, the shim base 47 is placed on the bosses 32 formed in the foregoing unit attachment surface 31 and serving as the datum level 37 of the tilt adjustment. The shim base 47 may be, for example, substantially L-shaped, and has a shape covering the screw holes 34 and the guides 35, 36. As the shim base 47, a thin resin material hard to be deflected may be employed. A thickness of the shim base 47 is D1 (see FIG. 7).

Figure 3:
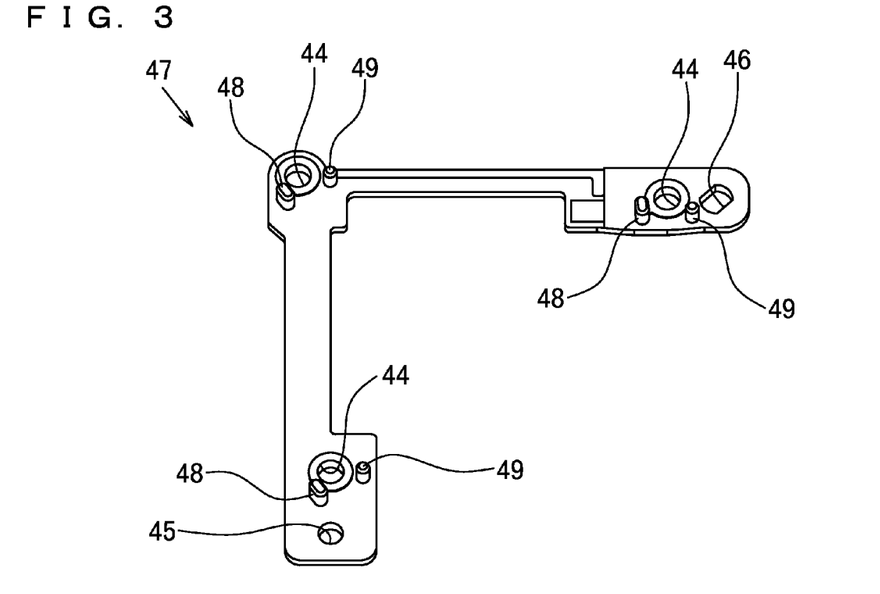
FIG. 3 is a perspective view of a shim base according to the one embodiment of the present invention.

In the shim base 47, loose holes 44 each having a larger diameter than the screw holes 34 are provided at positions opposite to the screw holes 34. Portions where these loose holes 44 are formed are attachment positions of the shims 51 described later. In the illustrated example, since the loose holes 44 are formed at three portions, the shims 51 may also be placed at up to three portions.

Figure 4:
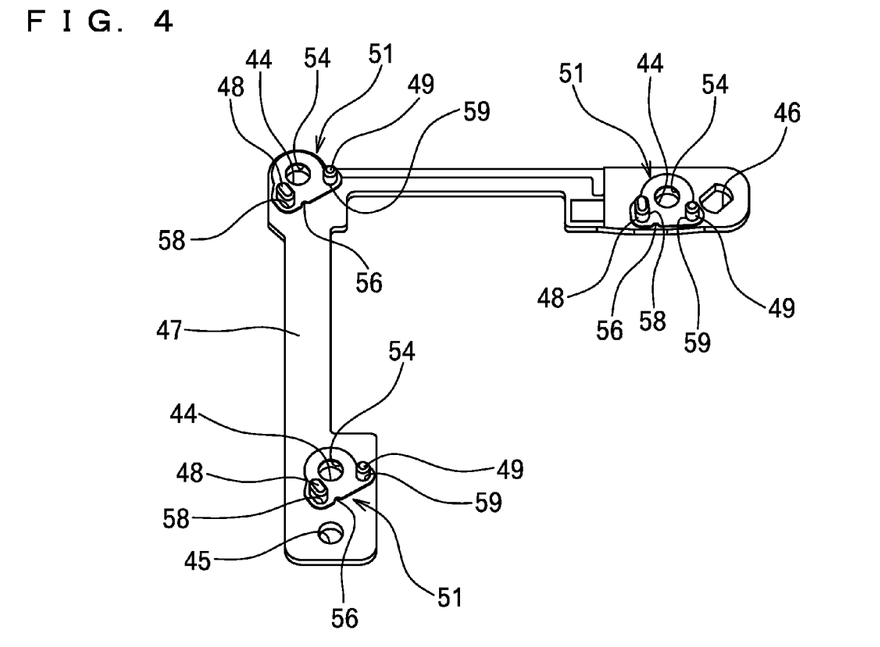
FIG. 4 is a perspective view of a shim unit according to the one embodiment of the present invention.

Moreover, in the shim base 47, guide holes 45, 46 into which the guides 35, 36 are respectively fitted are provided at positions opposite to the guides 35, 36. One guide hole 46 of the guide holes has a long hole shape as shown in FIGS. 3 and 4 to allow variation of the shim unit 40 or the like, and facilitate the positioning when the shim unit 40 is attached to the unit attachment surface 31.

In the shim base 47, positioning projections 48, 49 that serve as a positioning mechanism to position the placed one or plurality of shims 51 are projected in a circumferential edge of each of the loose holes 44.

The shims 51 placed on the shim base 47, as shown in FIGS. 3 to 6, Maybe each a thin plate-like ring member in which a loose hole 54 overlapping each of the foregoing loose holes 44 of the shim base 47 is provided. The loose hole 54 of each of the shims 51 is a little smaller than each of the loose holes 44 of the shim base 47, which can suppress influence on thickness adjustment even if the loose hole 54 has a burr.

Figure 5:
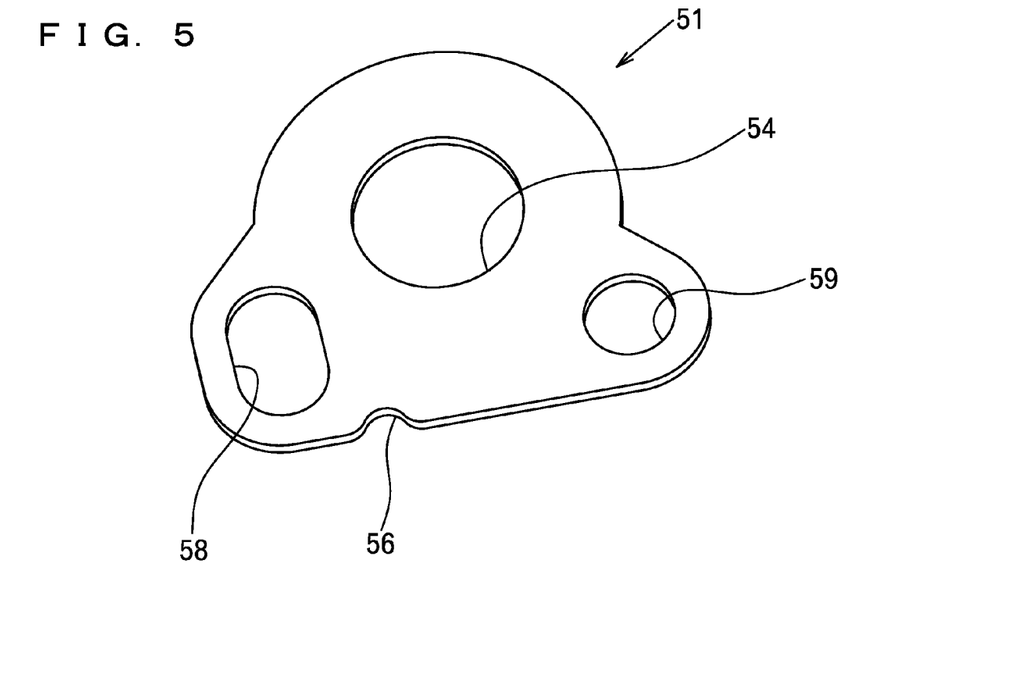
FIG. 5 is a perspective view of a shim according to the one embodiment of the present invention.
Figure 6:
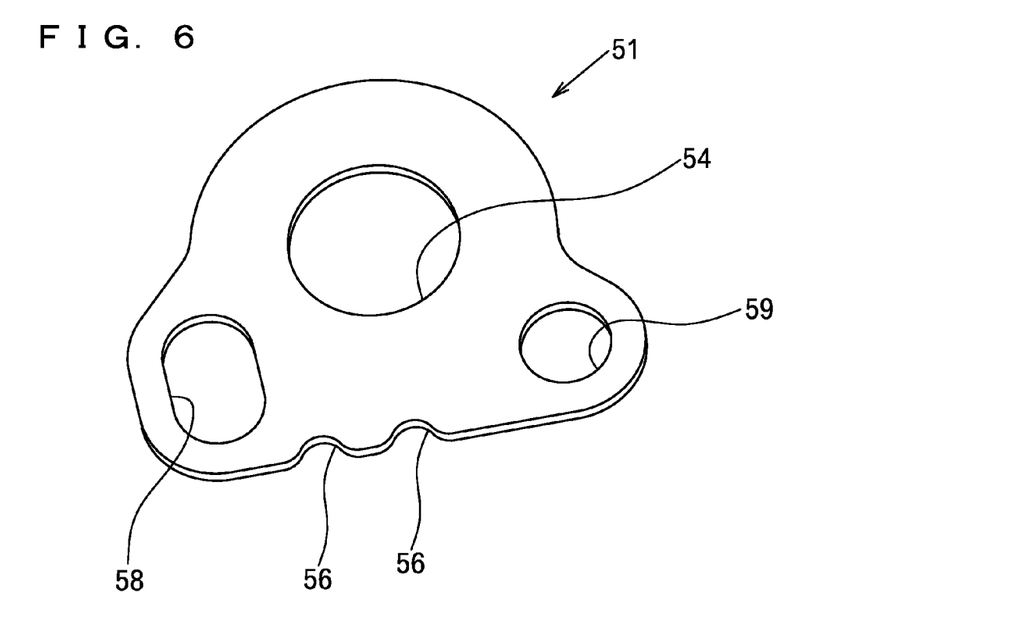
FIG. 6 is a perspective view of a shim according to another embodiment of the present invention.

In each of the shims 51, positioning holes 58, 59 that serve as a positioning mechanism to position to the shim base 47 are provided in a circumferential edge of the loose hole 54.

In the illustrated example, the positioning projection 48 and the positioning projection 49 serving as the positioning mechanism are differentiated in shape such that a cross section of the positioning projection 48 has a rectangular shape with rounded corners, and a cross section of the positioning projection 49 has a circular shape. In response to this, the positioning hole 58 and the positioning hole 59 formed in the shim 51 also have a rectangular shape with rounded corners, and a circular shape, respectively. In this manner, differentiating the shapes of the positioning projections 48, 49 and the positioning holes 58, 59 can prevent an attachment error between a right side and a wrong side of the shims 51.

The shims 51 will be described in more detail. For the shims 51, a thin material hard to be deformed in thickness by application of a load may be employed, and for example, thermoplastic resin such as PET (polyethylene telephthalate), PON (polyacetal), PC (polycarbonate), or acryl may be exemplified.

For the shims 51, in order to perform the tilt adjustment, it is desirable that those having a plurality of thicknesses may be selected. For example, the shims 51 may have four thicknesses D2 of 38 μm, 75 μm, 125 μm, and 188 μm. In order to distinguish the thicknesses D2 of the shims 51 by appearance, it is desirable that the shims 51 are differentiated in color, and that as shown in FIGS. 5 and 6, a cutout(s) 56 is formed in a circumferential edge of each of the shims 51 in accordance with the thickness. For example, in the case of the shims 51 having the above-described four thicknesses, two types of colors are set, and the number of the cutouts is set to one as shown in FIG. 5 and the number of the cutouts 56 is set to two as shown in FIG. 6. Thus, the shims 51 having the four thicknesses can be distinguished by appearance.

Figure 7:
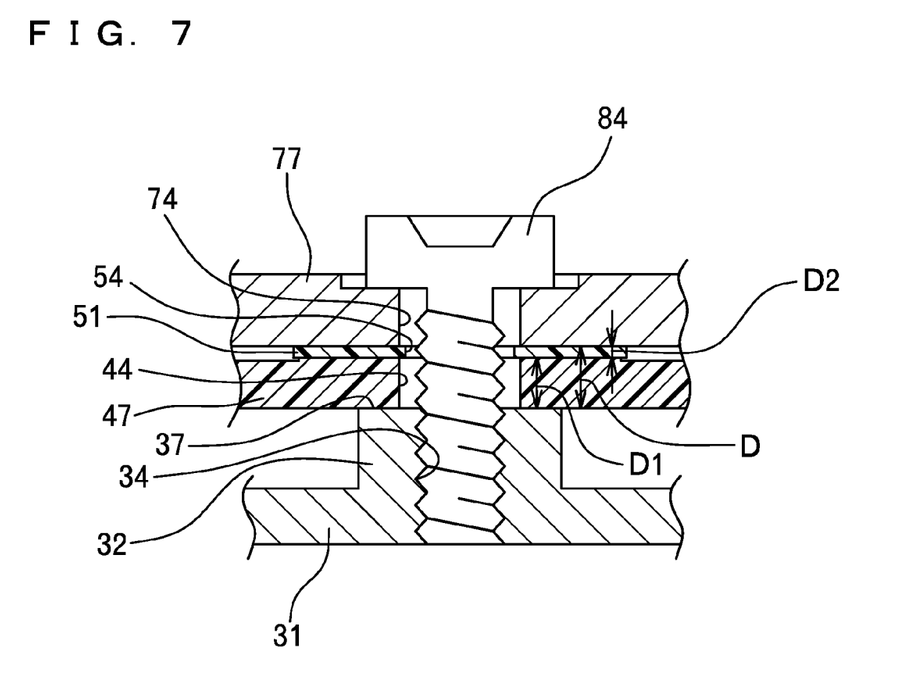
FIG. 7 is a cross-sectional view of a substantial portion of the lens unit along a screw attaching an element attachment plate.

A single type of or a plurality of types of shims 51 may be used in combination in accordance with a tilt angle and a flange back amount to be adjusted, and as shown in FIG. 7, a total D of the thickness D1 of the shim base 47 and the thickness D2 of the shim 51 is a thickness of the shim unit 40 for the tilt adjustment.

Obviously, if the tilt adjustment is not necessary, it is possible that no shims 51 are placed on the shim base 47.

The shim unit 40 having the above-described configuration is used by fitting the positioning projections 48, 49 of the shim base 47 into the positioning holes 58, 59 of the selected shim 51 in accordance with the tilt angle and the flange back amount to be adjusted.

The shim unit 40 is attached to the unit attachment surface 31 by fitting the guides 35, 36 of the unit attachment surface 31 of the lens barrel 30 into the guide holes 45, 46 of the shim base 47, respectively as shown in FIGS. 2 and 7 in a state where the shims 51 are beforehand placed on the shim base 47 as shown in FIG. 4.

The image pickup element unit 60 is attached from above in a state where the shim unit 40 is attached to the unit attachment surface 31.

As shown in FIG. 2, the image pickup element unit 60 may be configured by attaching the image pickup element 62 having an image pickup surface 61, such as a CCD or a CMOS, to one surface of the element attachment plate 77 made of metal such as aluminum alloy through a sensor substrate 63. The sensor substrate 63 may be electrically connected to a control system of the image pickup device 10 by a flexible substrate 65 or the like.

In the element attachment plate 77, loose holes 74 each having a larger diameter than the screw holes 34 are provided at positions corresponding to the screw holes 34 of the foregoing unit attachment surface 31. Moreover, guide holes 75, 76 are provided at positions corresponding to the guides 35, 36 of the unit attachment surface 31. The guide hole 76 has a long hole shape to allow variation in molding accuracy of the image pickup element unit 60 and the like, and facilitate the positioning.

As shown in FIGS. 2 and 7, in the image pickup element unit 60 having the above-described configuration, the guides 35, 36 are fitted into the guide holes 75, 76 in the state where the shim unit 40 is attached to the lens barrel 30, and screws 84 are inserted into the loose holes 74 to be screwed into the screw holes 34 of the unit attachment surface 31, so that the lens unit 20 can be manufactured.

As can be understood with reference to an enlarged cross-sectional view along the screw 84, the shim unit 40 is placed on the bosses 32 serving as the datum level 37 of the unit attachment surface 31, and the image pickup element unit 60 is placed on the shims 51 of the shim unit 40.

In the present invention, the thickness D of the shim unit 40 is decided in accordance with a deviation of an optical axis A of the lens barrel 30 and a deviation of the image pickup element unit 60, and the shims 51 at the shim mounting positions 38α, 38β, 38γ are selected such that the shim unit 40 has the desired thickness D, and the shims 51 can be beforehand placed on the shim base 47. Accordingly, in the assembly of the lens unit 20, only by placing the shim unit 40 on the unit attachment surface 31 of the lens barrel 30, and subsequently placing the image pickup element unit 60 to fasten the same by the screws 84, the tilt adjustment can be performed at the same time as the attachment of the image pickup element unit 60.

Figure 8:
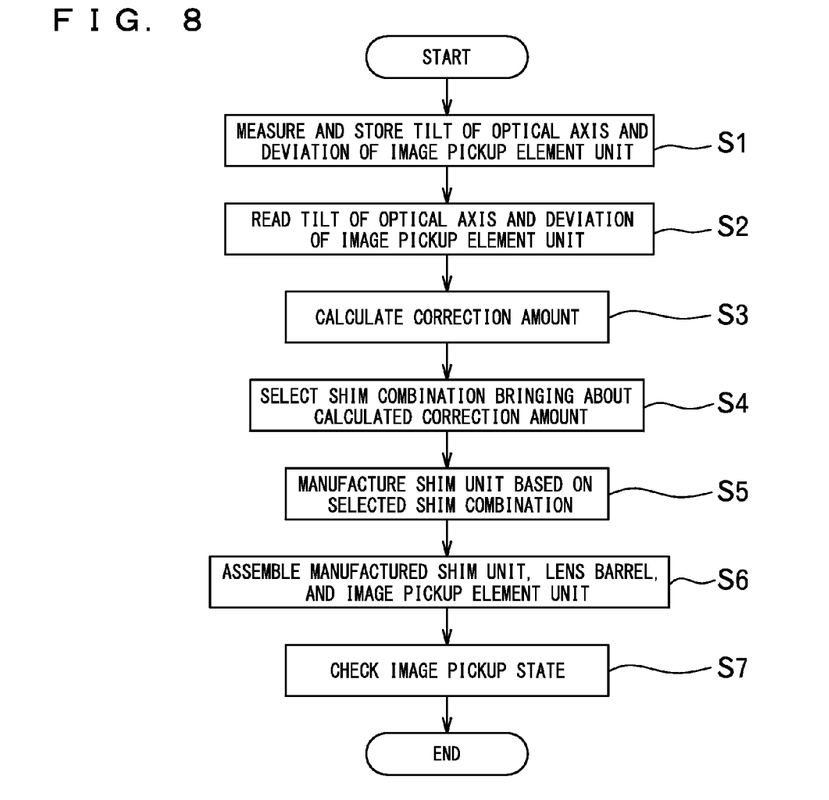
FIG. 8 is a flowchart showing a tilt adjustment procedure of the lens unit according to the one embodiment of the present invention.

The lens barrel 30, the shim unit 40 and the image pickup element unit 60 having the above-described configurations can be assembled in a manner shown in a flowchart of FIG. 8.

A tilt (deviation) of the optical axis (shown by arrow A in FIG. 2) of the lens barrel 30 and a parallelism (deviation) between the element attachment plate 77 and the image pickup surface 61 of the image pickup element unit 60 are beforehand measured.

As to the tilt of the optical axis A of the lens barrel 30, a deviation in a thickness direction from the design center X of the datum level 37 of each of the bosses 32 abutting on the shim unit 40 may be set as a correction amount C1.

As to the deviation of the image pickup element unit 60, a deviation in the thickness direction from a design center (a position opposite to the design center X of the datum level 37) of each of the loose holes 74, through which the screws 84 are screwed into the bosses 32, of the element attachment plate 77 maybe set as a correction amount C2, based on height information of the image pickup surface 61.

Information of the measured deviations is attached to the individual lens barrels 30 and the individual image pickup element units 60, using seals or the like as QR (Quick Response) information 39, 69. Moreover, the information is stored in a control PC 90 (step S1 and FIG. 9).

The above-described information of the deviations may be bar codes in place of the QR information. Moreover, individual equipment numbers of the lens barrel 30 and the image pickup element unit 60 and the information of the corresponding deviations may be stored in the control PC 90.

In assembling the lens unit 20, firstly, one lens barrel 30 and one image pickup element unit 60 are taken out from a plurality of lens barrels 30 and a plurality of image pickup element units 60 to make a pair.

Figure 9:
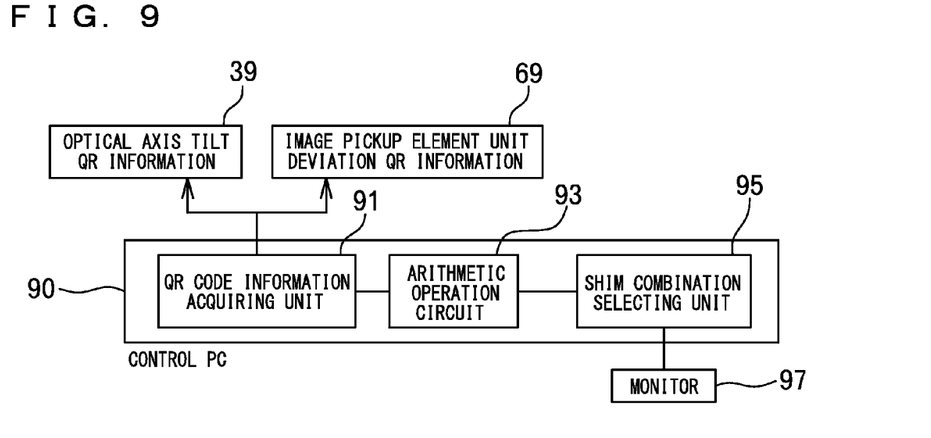
FIG. 9 is a block diagram of a system that performs selection of optimal shims.

For each of the paired lens barrel 30 and the image pickup element unit 60, the QR information thereof is optically read (step S2). The read QR information is sent to a QR code (registered trademark) information acquiring unit 91 of the control PC 90 as shown in FIG. 9.

An arithmetic operation circuit 93 calls the correction amount C1 in the thickness direction of the deviation of the lens barrel 30, and the correction amount C2 in the thickness direction of the deviation of the image pickup element unit 60, which correction amounts are prestored, from the QR information obtained in the QR code information acquiring unit 91 to calculate a correction amount C at each point (step S3). More specifically, the correction amount C is C1+C2.

The calculated correction amounts C are transmitted to a shim combination selecting unit 95 to calculate all combinations of the shims 51 such that the thicknesses D at the respective shim mounting positions 38α, 38β, 38γ of the shim unit 40 are the calculated correction amounts C at the respective positions 38α, 38β, 38γ, and then, the thicknesses D2 of the shims 51 placed at the respective positions 38α, 38β, 38γ are decided (step S4). More specifically, C (=D)=D1+D2. When four types of shims 51 different from each other in thickness are used as described above, the shims 51 that make D1+D2 closest to the correction amounts C may be selected.

If the calculated correction amount C exceeds a correctable value by the shim unit 40, the tilt adjustment is not performed, and thus, the pair of the lens barrel 30 and the image pickup element unit 60 may be changed.

The combination of the shims 51 selected by the shim combination selecting unit 95 may be displayed on a monitor 97. An assembly worker arranges the selected shims 51 on the shim base 47 with reference to the monitor 97 to manufacture the shim unit 40 (step S5).

The manufactured shim unit 40, and the paired lens barrel 30 and image pickup element unit 60 are assembled (step S6).

Specifically, the manufactured shim unit 40 is placed on the lens barrel 30, and further, the image pickup element unit 60 is placed to be fastened by the screws 84 at a predetermined torque, so that the lens unit 20 can be manufactured.

In the manufactured lens unit 20, the shim unit 40 whose thickness is beforehand adjusted allows the assembly and the tilt adjustment to be performed only by tightening the screws 84, so that the time required for these can be shortened as much as possible.

As to the assembled lens unit 20, in order to confirm whether or not the intended tilt adjustment is achieved, light is actually caused to enter to check an image pickup state, with which the product assembly ends (step S7).

As described before, the shim unit 50 can be disposed on the unit attachment surface 31 of the lens barrel 30 in the state where the shims 51 are beforehand placed on the shim base 47. This can enhance work efficiency, as compared with a case where the individual shims are directly disposed to the unit attachment surface 31, and the shims 51 are prevented from coming off into the lens barrel 30.

When the lens unit 20 is disassembled in maintenance or the like as well, the whole shim unit 40 can be detached, which can prevent the individual shims 51 from coming off into the lens barrel 30.

Moreover, according to the present invention, since the correction amounts are calculated from the deviations of the lens barrel 30 and the image pickup element unit 60 to select the shims 51 each having the optimal thickness to be placed on the shim base 47, the assembly and inspection work can be reduced, as compared with a case where the tilt adjustment is performed after assembly.

While in the foregoing, only the correction amounts C of the lens barrel 30 and the image pickup element unit 60 are corrected by means of the thicknesses D of the shim unit 40, it is desirable that for example, when an error specific to each lot of the lens barrel 30 or the image pickup element unit 60, or an error specific to assembly is caused, or when the shim unit 40 is attached to the lens barrel 30 or the image pickup element unit 60 by a double-faced tape, this value is fed back to the correction amounts C to decide the thicknesses D of the shim unit 40.

The configurations of the respective components of the present invention are not limited to the above-described embodiment, but various modifications may be made within the technical scope of the claims.

For example, after the shims 51 are attached to the shim base 47, the shim unit 50 may also be disposed in the lens barrel 30 in a state where the shim unit 40 is beforehand assembled with the image pickup element unit 60.

Figure 10:
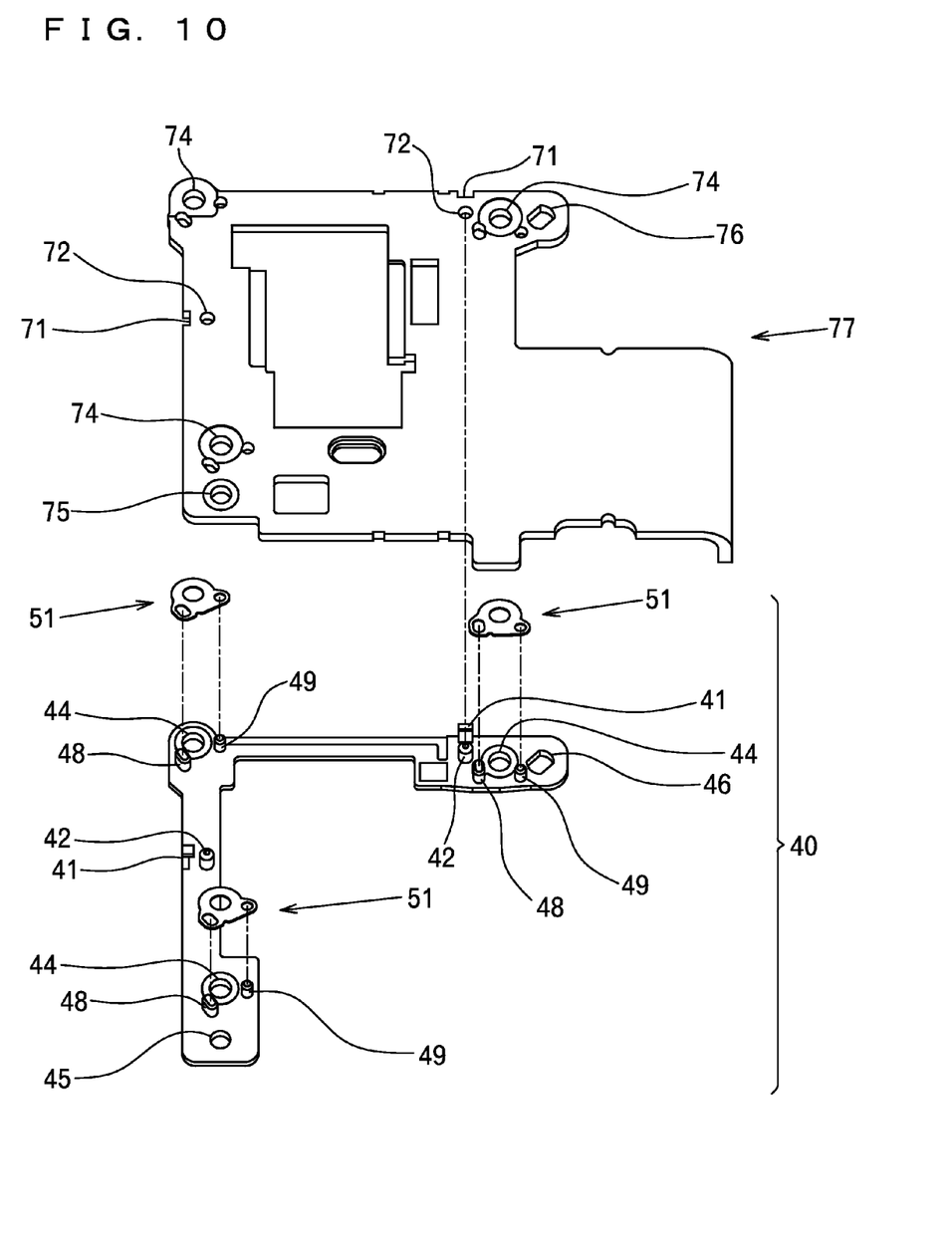
FIG. 10 is an exploded perspective view of a shim unit and an image pickup element unit according to another embodiment of the present invention.

As this example, as shown in FIG. 10, a configuration may be exemplified in which in the shim base 47, two elastically deformable hooks 41 are projected, and in the element attachment plate 77, depressions 71 that can be engaged with the hooks 41 are formed. In order to facilitate the positioning of the shim unit 40, positioning projections 42, 42 may be projected in the shim base 47, and in the element attachment plate 77, positioning holes 72, 72 into which the positioning projections 42, 42 are fitted may be formed.

Figure 11:
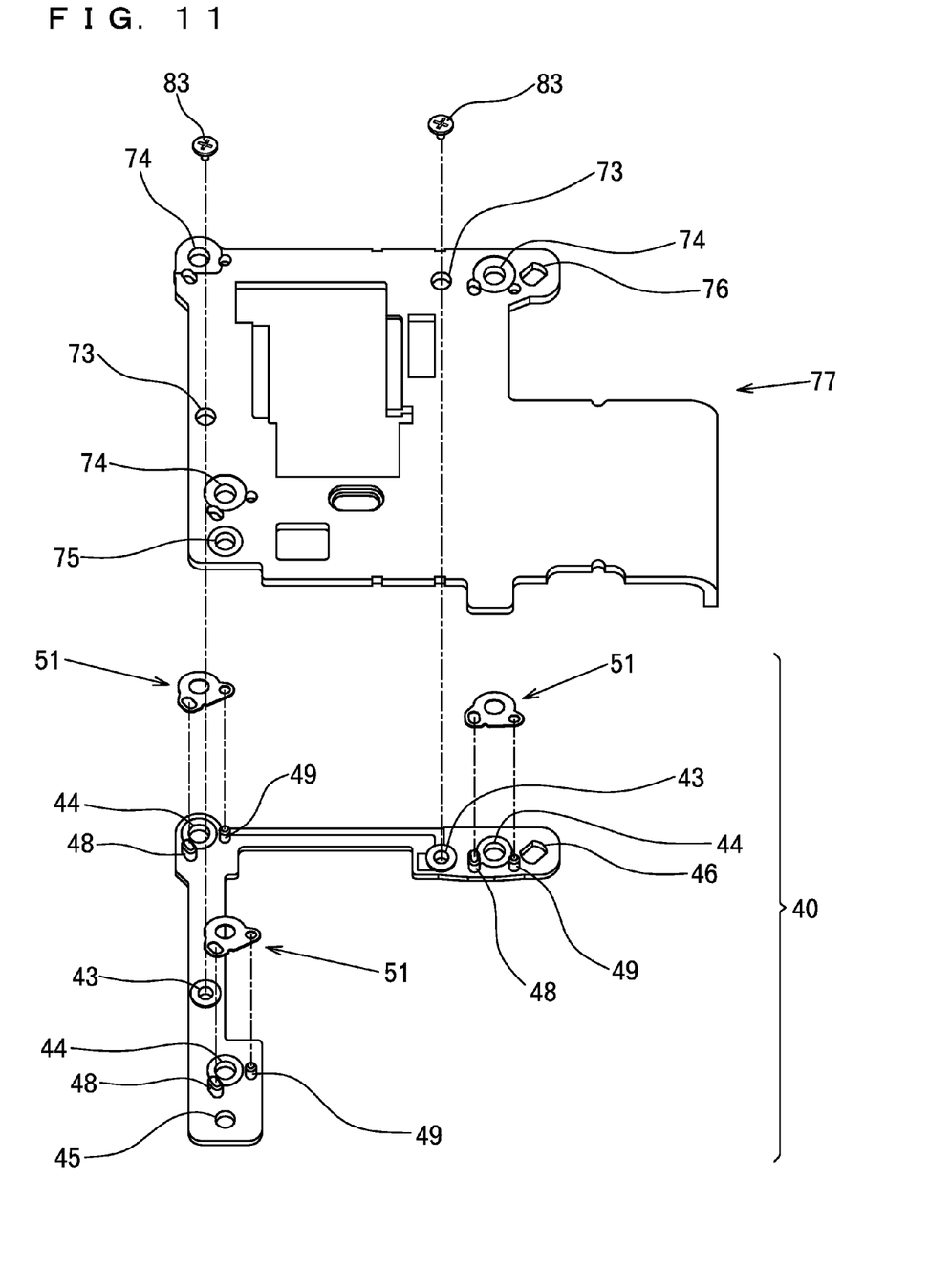
FIG. 11 is an exploded perspective view of a shim unit and image pickup element unit according to still another embodiment of the present invention.

Moreover, as shown in FIG. 11, the shim unit 40 may be formed with screw holes 43, and the element attachment plate 77 may be formed with loose holes 73, so that the shim unit 40 and the image pickup element unit 60 may be integrated by tightening screws 83.

As described above, integrating the shim unit 40 and the image pickup element unit 60 beforehand allows the shims 51 to be sandwiched between the shim base 47 and the element attachment plate 77, thereby preventing the shims 51 from coming off, which can make handling of these easier.

Moreover, the shape of the shim base 47 is not limited to the L shape, but various selections can be made from a U shape, a frame shape having a rectangular hole, and the like.

The foregoing thickness and shape of the used shims 50 are only examples, and obviously, the numerical values and the like are not limited to the cited ones in the present invention. For example, five or more types of shims 50 may be used or a plurality of shims 51 may be superimposed to adjust the thickness.

Moreover, as a procedure of the tilt adjustment, after sandwiching the shim unit 40 between the lens barrel 17 and the image pickup element unit 60 to perform temporary assembly, the tilt of the image pickup surface 61 against the lens optical axis A is measured, and the lens unit can be reassembled while performing the tilt adjustment.

INDUSTRIAL APPLICABILITY

The present invention is useful as a lens unit capable of easily performing tilt adjustment between an image pickup element and a lens barrel, and an image pickup device including the same.

DESCRIPTION OF REFERENCE CHARACTERS

10 digital camera (image pickup device)
20 lens unit
30 lens barrel
33 image pickup window
40 shim unit
47 shim base
51 shim
60 image pickup element unit
62 image pickup element
77 element attachment plate
84 screw

The invention claimed is:

1. A lens unit comprising:
    a lens barrel that contains a lens inside, has a rectangular image pickup window through which an optical axis passes, and is provided with a plurality of projected portions each formed with a first hole near the image pickup window; and
    an image pickup element unit including an image pickup element, and an element attachment plate having the image pickup element mounted on one surface and a plurality of second holes,
    the lens unit having the image pickup element unit attached to the lens barrel by inserting members through the first holes and the second holes such that the image pickup window and the image pickup element are opposite to each other,
    wherein a shim unit is disposed between the lens barrel and the element attachment plate, and the shim unit is made of a shim base attached to a circumferential edge of the image pickup window and having a shape along at least two sides of the image pickup window, and one or a plurality of shims mounted at one or a plurality of portions of the shim base, respectively.

2. The lens unit according to claim 1, wherein different thicknesses of the shims can be selected, and cutouts are formed in a circumferential edge in accordance with a thickness.

3. The lens unit according to claim 1, wherein the shim base and the shim include a positioning mechanism that positions the shim such that the shim cannot rotate.

4. The lens unit according to claim 2, wherein the shim base and the shim include a positioning mechanism that positions the shim such that the shim cannot rotate.

5. The lens unit according to claim 3, wherein the positioning mechanism is a positioning projection projected in the shim base, and a positioning hole that is provided in the shim and into which the positioning projection is fitted.

6. The lens unit according to claim 4, wherein the positioning mechanism is a positioning projection projected in the shim base, and a positioning hole that is provided in the shim and into which the positioning projection is fitted.

7. The lens unit according to claim 1, wherein the shim unit is disposed between the lens barrel and the element attachment plate in a state where the shim is beforehand mounted on the shim base.

* * * * *